July 9, 1946.　　　　A. SABE　　　　2,403,759

FISH LURE

Filed Oct. 31, 1944

Inventor

Andrew Sabe.

By Clarence A. O'Brien
and Harvey B. Jacobson
Attorneys

Patented July 9, 1946

2,403,759

UNITED STATES PATENT OFFICE 2,403,759

FISH LURE

Andrew Sabe, Tunbridge, N. Dak.

Application October 31, 1944, Serial No. 561,196

1 Claim. (Cl. 43—42)

My invention relates to improvements in fish lures, for fresh water fishing especially, the primary object in view being to provide a lure in the form of a fish adapted especially, although not necessarily, to float on its side and develop when pulled along the surface of the water the maximum motion possible so as to simulate a wounded fish but which may be used in the natural position with the same results as regards motion, obviates the use of metal or wood in the body structure thereof, and is simple in construction and inexpensive to manufacture and replace.

To the accomplishment of the above, and subordinate objects presently appearing, a preferred embodiment of my invention has been illustrated in the accompanying drawing, set forth in detail in the succeeding description, and defined in the claim appended hereto.

Figure 1:
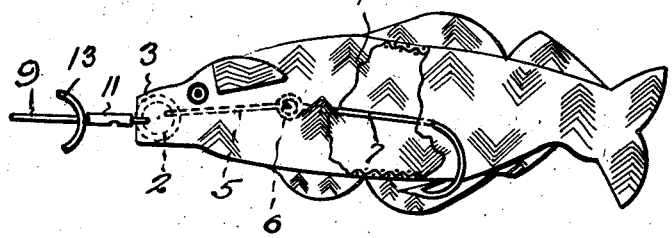
Figure 2:
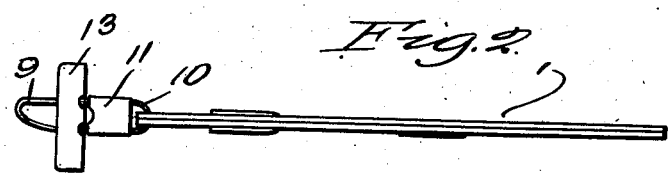
Figure 4:
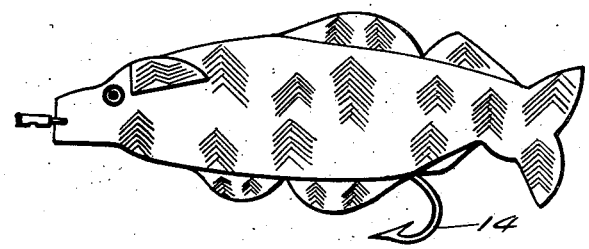
Figure 3:
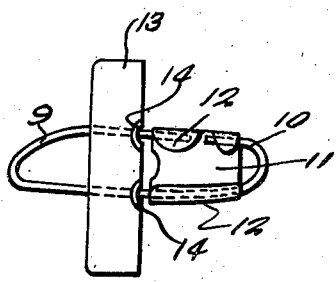

In said drawing:

Figure 1 is a view in side elevation of my improved fish lure, in a preferred embodiment thereof, Figure 2 is a view in plan, Figure 3 is a detail view in plan of the leader and wobbler and drawn to an enlarged scale, and Figure 4 is a view in side elevation illustrating a modification of the invention.

Referring to the drawing by numerals, in the illustrated embodiment thereof, my invention comprises a body 1 having the shape of a fish, of any selected species, and which is formed of yarn, or thread, knitted, crocheted, or spun woven, to form the body and head in one piece and hollow.

A ring 2 is inserted part way into the mouth 3 of the body 1, in vertical position in the mouth, and suitably fixed therein against pulling loose.

A suitable coupling 5, of gut, or the like, extends from the ring 2 into the body 1, to the usual eye 6 on the shank 7 of a conventional fish hook 8, the shank 7 of which is disposed in the body 1 and extends rearwardly out of one side of the same to expose the barbed end of said hook, at said side, with the barbed end spaced outwardly of the line of the belly of said body 1 and pointing forwardly.

Extending from the ring 2 is a wire loop leader 9 having substantially the form of a safety pin with a rear hook end 10 passed through said ring 2, and a locking slide plate 11 closing said hook end 10 with side edges 12 rolled around the sides of the leader and frictionally engaging the same so that said plate may be slide into and from closing position and frictionally retained in said position. The usual line, not shown, is attached to the front end of said leader as will be understood.

A wobbler is provided on the leader 9, forwardly of the plate 11, comprising a member 13 of thin sheet metal and which is of elongated form and arcuate cross section. The member 13 is provided with a pair of suitable apertures 14 intermediate its ends and in the longitudinal center thereof through which the sides of the leader 9 extend and whereby the member is loosely mounted on said leader to extend endwise across the same in a common plane therewith with its concave side facing forwardly. As will be clear by virtue of the described loose mounting of the member 13 on the leader 9 said member is free to wobble sidewise on said leader and may be slid forwardly thereon to permit the locking plate 11 to be moved into unlocking position. As will be seen the leader 9 is attached to the ring 2 to lie in a plane at a right angle substantially, to the plane of the body 1 whereby when the body is drawn along the surface on its side, the member 13 is disposed upright in the water. On the other hand when the body 1 is drawn in natural position through the water the member 13 will lie substantially horizontally in the water or partly submerged therein.

As shown in Figure 4 the hook, designated 14, may be extended out of the belly of the body 15 of the lure substantially in the plane of said body to counterbalance the same so that the body will assume the natural position in the water.

In the preferred use of the invention the body is drawn along the surface of water on the side from which the hook 8 extends. The member 13 thus being disposed substantially upright is caused by the pressure of the water to wobble from side to side and to dip up and down thereby imparting to the body 1 rapid and varied motion simulating the wiggling of a wounded fish. The attraction of such bait to fish is well known. When the body is drawn through the water in its natural position the member being disposed substantially horizontally the member wobbles vertically and darts in a zig-zag manner imparting vertical wiggling motion to the body and causing the same to zig-zag through the water.

As will be clear, the described lure may be inexpensively and easily made in various colors, in imitation of tropical fish and the like, and is inexpensive to replace.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a fish lure, a body of flexible material, having the form of a fish, a leader at the front end of the body, and a wobbler member on said leader comprising an elongated plate of arcuate cross section, said leader having the form of a wire loop, said member extending endwise across aid leader so that the long edges thereof are in a plane at a right angle substantially to the plane of the leader and being loosely mounted on said leader to wobble sidewise.

ANDREW SABE.